Sept. 6, 1966   N. R. GOSSELIN   3,270,641
REMOTE INSPECTION DEVICE AND THREADED MEMBER USED THEREIN
Filed July 1, 1963   6 Sheets-Sheet 1

United States Patent Office 3,270,641
Patented Sept. 6, 1966

3,270,641
REMOTE INSPECTION DEVICE AND THREADED MEMBER USED THEREIN
Norman R. Gosselin, Marblehead, Mass., assignor to Iota-Cam Corporation, Lynn, Mass., a corporation of Massachusetts
Filed July 1, 1963, Ser. No. 291,777
19 Claims. (Cl. 95—11)

This invention relates to apparatus for carrying out remote visual inspections and to mechanical features which enable operation of the apparatus. The invention in particular provides a snake-like remote inspection device that can "lift its head and look around" after it has entered a remote area, to transmit visual images to an operator and make a series of photographs, the device being precisely controllable by the operator.

The invention will be described in detail wtih reference to the accompanying drawings wherein.

Figures 1, 2, 3, 4, 5:
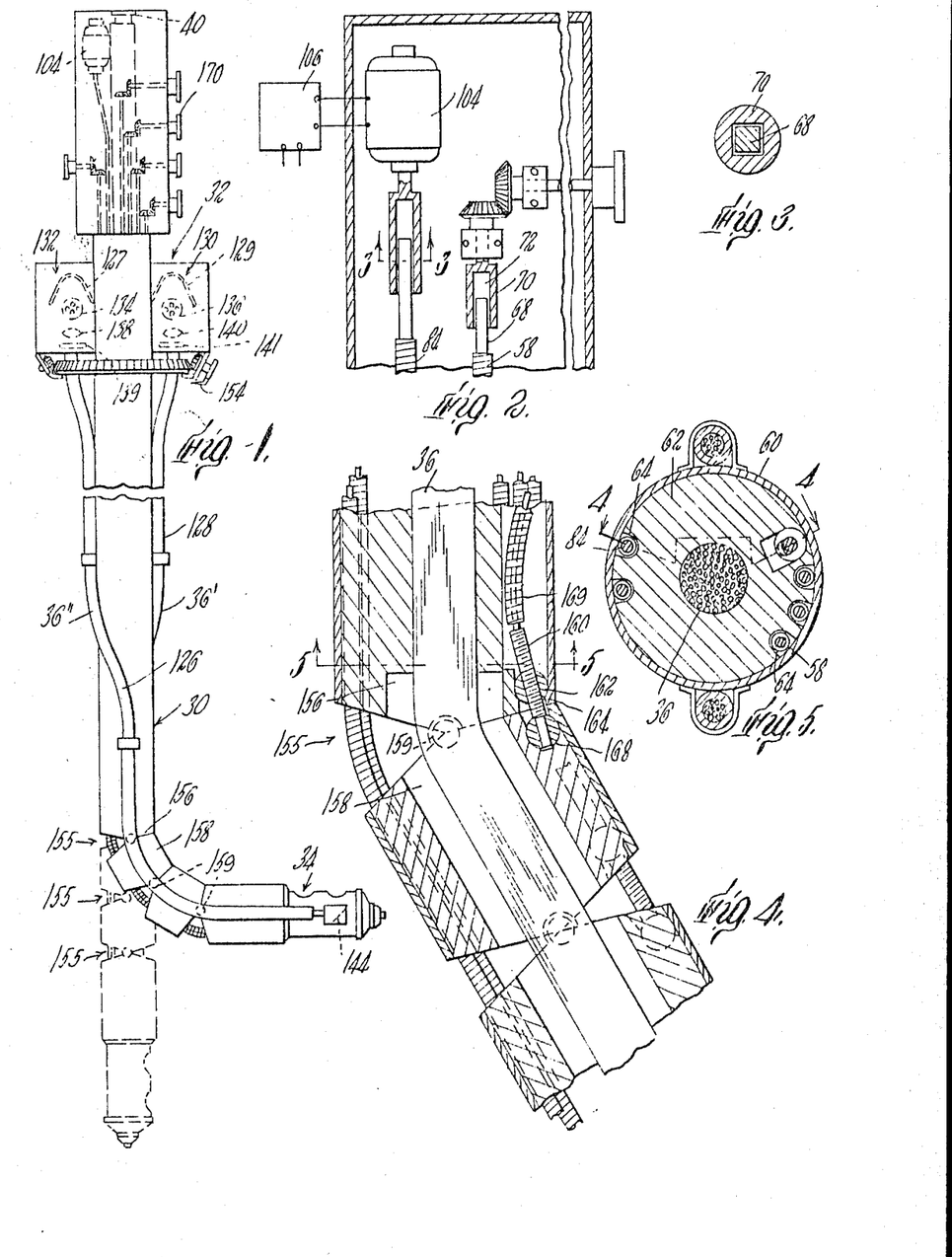
FIG. 1 is a side view of a preferred embodiment of a long snake-like inspection device according to the present invention.
FIG. 2 is a lengthwise cross-sectional view of part of the control mechanism at the proximal end of the device of FIG. 1.
FIG. 3 is a cross-sectional view taken on lines 3—3 of FIG. 2.
FIG. 4 is a lengthwise cross-sectional view taken on lines 4—4 of FIG. 5 of an articulation or knuckle device in the snake-like member.
FIG. 5 is a transverse cross-sectional view taken on lines 5—5 of FIG. 4.
Figure 6:
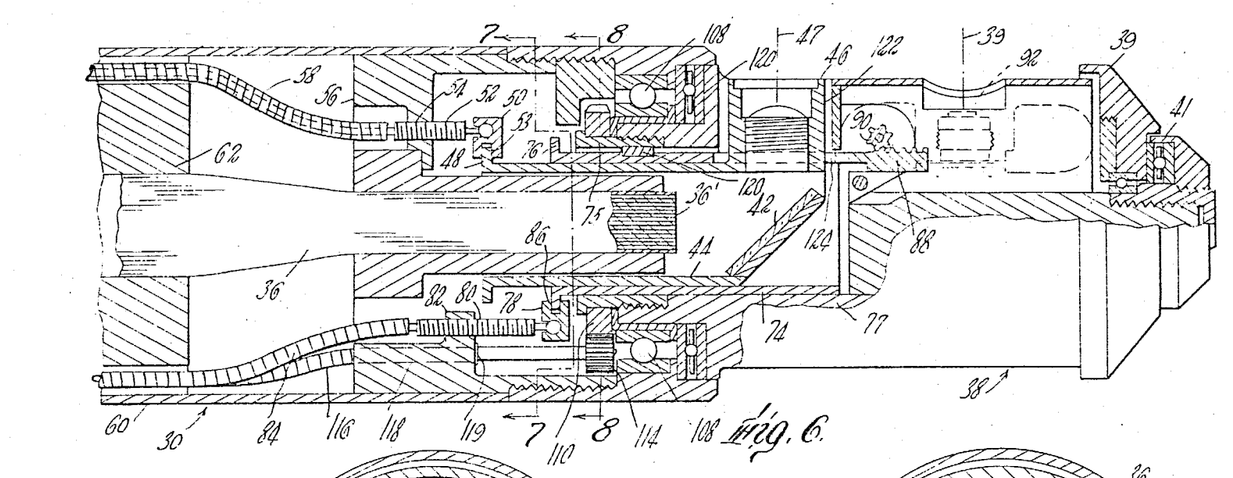
FIG. 6 is a lengthwise cross-sectional view of the cammera and viewing device at the distal end of the snake-like member of FIG. 1.
Figure 7:
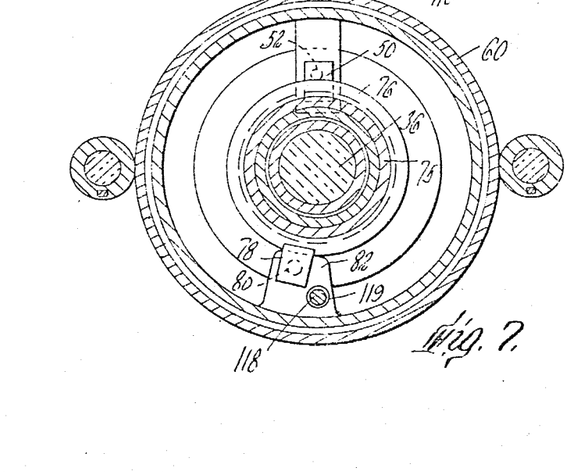
FIGS. 7 and 8 are transverse cross-sectional views of the mechanism of FIG. 6 taken on lines 7—7 and 8—8, respectively.
Figure 8:
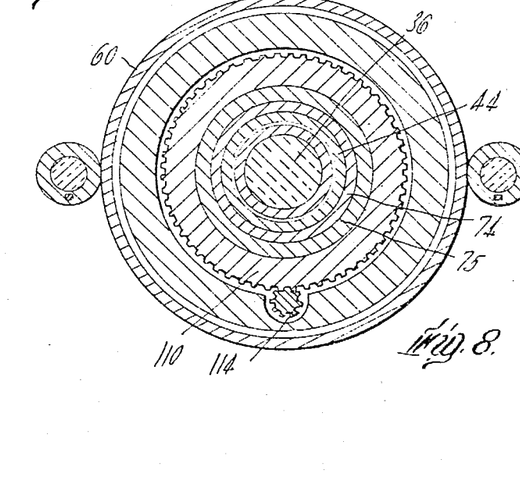

Referring to FIG. 1, the device of the preferred embodiment comprises an elongated snake-like member 30 which has a proximal end 32 at which the device is controlled and a distal end 34 for optically inspecting a remote area. The snake-like member incorporates at least one flexible bundle 36 of elongated light-conducting fibers (FIGS. 4–8) which extend between the two ends of the device. In the preferred embodiment the bundle of fibers 36 is employed as a viewer for a rotatable camera 38 (FIG. 6), the bundle of fibers being provided with an eye piece 40 (FIG. 1) at the proximal end of the device and a mirror 42 (FIG. 6) at the distal end for directing a light image into the end face 36' of the bundle 36, said end face being circular and axially aligned within the snake-like member. In the preferred embodiment the mirror 42 (FIG. 6) is mounted on a carrier member 44 (FIGS. 6, 17), preferably for ease of construction in the form of a cylinder, the carrier member mounted concentrically with the bundle 36 of flexible fibers for rotation about the lengthwise axis of the bundle of fibers and for axial movement with respect thereto. The mirror 42 is mounted relative to the axis of end face 36' in the manner that alignment is preserved regardless of the rotational or axial location of the carrier member 44. The mirror 42 is positioned to receive a light image from objective means 46 (FIGS. 6, 17) the mirror is rigidly mounted to carrier member 44 by housing 122 which extends transversely to the axis of the carrier member. The focus of the image in the flexible bundle 36 of fibers is accomplished by axial adjustment of the carrier member 44 relative to the bundle. For this purpose an annular flange 48 (FIGS. 6, 17) is joined to the proximal end of the carrier member 44, spaced out of the way of the end face 36 of the bundle of fibers, the bundle extending through the flange along the axis thereof. Adjacent the flange a yoke member 50 is supported on the end of a male threaded member 52 (FIG. 6). A male member 52 is threaded into female threads 54 in a wall 56, serving as a fixed reaction block member, the male member 52 thus located to move axially with respect to the carrier member 44. The yoke member 50 has a slot 53 engaged with the periphery of the flange 48 for the purpose of pushing and pulling the carrier member 44 axially to change the axial distance of mirror 52 from the end face 36' of the bundle 36 of fibers to adjust the focus of the optical device. The yoke member 50 is restrained by the male member 52 from rotation with the flange 48 but permits rotation of the flange 48 for a purpose later to be described.

The male member 52 is actuated by a flexible, torque-transmitting cable 58 which extends in combination with the bundle 36, completely along the snake-like member to the point where it is actuated. Refering to FIG. 5, advantageously a flexible tubular outer protective sheath 60 defines the outer form of the snake-like member 30, and in the distal region of the instrument, a lightweight flexible filler or positioning member 62 surrounds the bundle 36 filling the space between the sheath and bundle 36, to position the latter centrally within the sheath. Lengthwise grooves 64 in the periphery of the filler member 62 cooperate with the sheath 60 to provide lengthwise extending passages from the proximal to the distal ends of the positioning member and the flexible torque-transmitting cable 58 is disposed in one of these passages. The grooves make assembling the snake-like member very easy. The cables are placed in the grooves while the sheath 60 is slipped over the filler member 62, whereby the cables are confined.

The means for actuating the cable 58 includes a spline member 68 (FIG. 2) which comprises an axial extension of the cable 58 and a rotatable driver 70 which is restrained from axial movement with the cable 58 and has slide surfaces that correspond with those of the spline 68, engaged therewith for sliding (FIG. 3). The rotatable driver 70 provides a space 72 (FIG. 2) at the end of the spline 68 to permit the spline and cable to slide axially relative thereto when the snake-like member 30 bends so that the cable 58 does not impede bending of member 30.

Advantageously, the torque-transmitting cable 58 comprises a plurality of concentric helices formed by small wires wound in opposite directions and inserted for rotatable support in a small stationary tube. The size of the cables is selected for the particular size of the inspection device, cables of diameters of .050 and .155 inch being examples. Advantageously, the filler member 62 is a convoluted member of fluorocarbon ("Teflon") plastic which provides a circular hole down the center for the fiber bundle. The sheath 60 can be a reinforced rubber tube or preferably a flexible, braided, tubular cable, of a diameter ranging from ½ inch to 2 inches and larger. The bundle 36 of flexible light-transmitting fibers can be of the conventional type, the fibers being internally reflective, and bound together at the ends of the bundle by epoxy resinous adhesive, the fibers in the bundle being loose between the ends so as to be flexible. According to the invention the conventional square-cross-section end bundle of fibers is modified by removing fibers to make the remote end round, thus to achieve a substantial saving in diameter of the snake-like member which would otherwise be needed to accommodate the corners of the square cross-section, while losing relatively little viewing cross-sectional area.

Referring to FIG. 6, the bundle 36 of flexible fibers, the mirror 42 and the objective means 46 serve as the viewer for rotatable camera 38, the carrier member 44 being adapted to rotate with the camera in a manner to be described later. To serve as a viewer the line of sight 47 of the objective means 46 must be located adjacent the camera line of sight 39. Such compact arrangement is efficiently provided by the unique axially and rotatably movable carrier member 44 that moves relative to the bundle 36 of fibers.

Figures 17, 18, 19, 20, 21, 22:
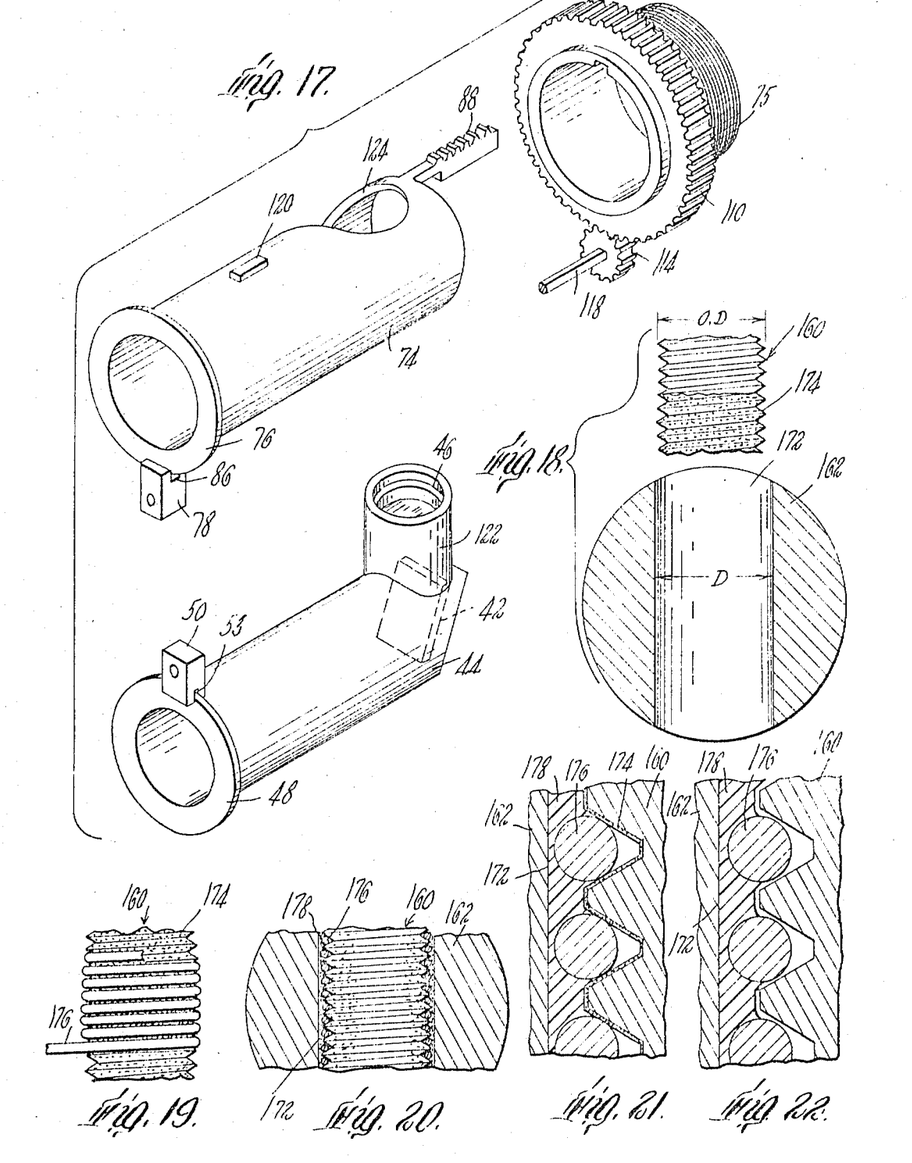
FIG. 17 is an exploded perspective view of the adjustment mechanisms for the camera and viewer of the device of FIG. 1.
FIG. 18 is a view of a threaded male member and a member in which mating female threads are to be formed.
FIGS. 19 and 20 show intermediate step in the formation of the female member.
FIG. 21 is a lengthwise cross-sectional view of the female threads being formed.
FIG. 22 is a view similar to FIG. 21 of the engaging male and female threads when completed, the clearances between the members in FIGS. 21 and 22 being greatly exaggerated.

A similar mechanism is employed for adjusting the film in the camera. Referring to FIGS. 6 and 17, a second movable member 74, preferably of cylindrical form, telescopically supports the carrier member 44 and a flange 76 on the proximal end of movable member 74 concentrically surrounds the carrier member 44. The movable member 74 itself is telescopically supported by bushing 75 and camera body 77. A block 78 is supported by male threaded member 80 which engages female threads in fixed wall 82, the male threaded member being driven by flexible torque-transmitting cable 84. The block 78 has a slot 86 engaged with the periphery of flange 76 for pushing and pulling the flange 76 axially while permitting its rotation. A rack member 88 (FIGS. 6, 13 and 17) is rigidly joined to the distal end of movable member 74, and moved axially back and forth by corresponding movements of the cable 84. This rack member 88 drives pinion 90 (FIGS. 6, 13), for taking up the film 94. Referring to FIGS. 6 and 12-16, the camera of the embodiment shown is of a shutter-less type, adapted for use in dark areas where the light can be turned off during movement of the film, and a flash burst of light of controlled duration can be employed to expose the film. In this camera the camera lens 92 is disposed over film 94 and the film extends from supply roll 96 to take-up reel 98. The take-up reel 98 has a flange 102 on whose side is mounted a dog 100 that is spring biased which engages pinion 90. The dog is adapted to be driven by the pinion 90 when the latter is driven clockwise, with the rack member 88 moving to the left, the dog 100 causing reel 98 to turn and take-up film. When the rack member and pinion are moved in the opposite direction, the dog releases from the pinion teeth so that the rack member can be returned without disturbing the film. Referring to FIGS. 1, 2, 5 and 6, the rack member 88 is driven by film take-up cable 84 which extends through the snake-like member in a passage formed by a groove in the filler member 62 and the tubular sheath 60. At the proximal end of the device a rotatable coupling like that used for the focusing cable 58 is driven by an electric motor 104 through a timer and controller 106 which drives the cable 84 to pull the rack member 88 to the left to wind up the film and then return the rack member to start position in a phased relation with the lighting sequence to be described later.

Referring again to FIG. 6, the rotatable camera 38 at the distal end of the snake-like member 30 is rotatably supported on an axis that corresponds to the axis of the bundle 36 of fibers by bearings 108 which engage bushing 75 that is threaded to the camera body 77. A bull gear 110 axially aligned with the camera is joined to the bushing 112 (FIGS. 6 and 17). A pinion 114 is engaged with the bull gear 110 for turning the camera about its axis, and shaft 118 that comprises the distal end of a flexible, torque-transmitting cable 116, extends through a bearing 119 in wall 82, wall 82 thereby serving as a reaction member, said shaft 118 driving pinion 114. As with the other cables, cable 116 is confined within a passage defined by a groove in the outer periphery of filler member 62 and the tubular sheath 60 of the snake-like member 30, and at the proximal end the cable is driven when it is desired to turn the camera.

It is an important aspect of this invention that the device for changing film in the camera 38 and the device for changing the focus of the camera enable the viewer and camera to be operated in every rotational position relative to the snake-like member. As has already been described, the carrier member 44 of the optical system and the movable member 74 of the film-change system are both provided with flanges which are engaged for axial movement by push-pull mechanisms which leave the flanges free for rotational movement. The movable member 74 is keyed at 120 (see FIGS. 6 and 17), to the bushing 75 so that when the bushing and camera are rotated by bull gear 110 the movable member 74 is also rotated and drives the carrier member 44 by means of the housing 122 for the objective lens 46 which housing rigidly extends from carrier member 44 through an elongated slot 124 in the movable member 74, the lengthwise sides of the slot engaging the sides of the transverse housing 122. The slot 124 is elongated in the direction of the axis of the bundle 36 of fibers to permit axial movement of the housing 122 when the carrier member 44 is shifted axially for changing the focus.

The camera 38 is provided with a tire-like member 39 at its distal end which is rotatably mounted by bearings 41 to the body of the camera. This tire-like member engages the surfaces against which the snake-like member and camera slide during insertion and removal into a remote plate to be examined. The tire-like member aids in this movement and enables the camera to be freely rotated relative to said surfaces.

Figure 9:
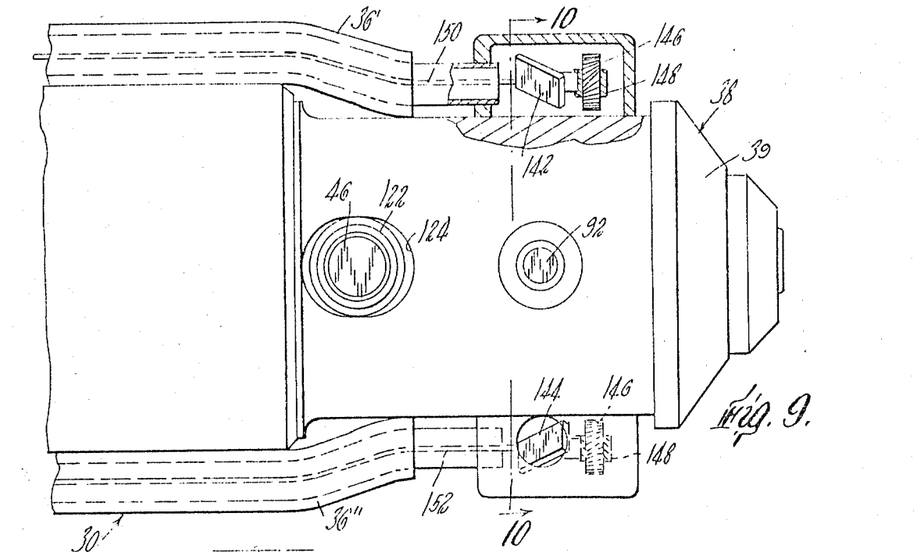
FIG. 9 is a plan view, partially in cross-section, of the camera and the preferred lighting means therefor.
Figures 10, 11:
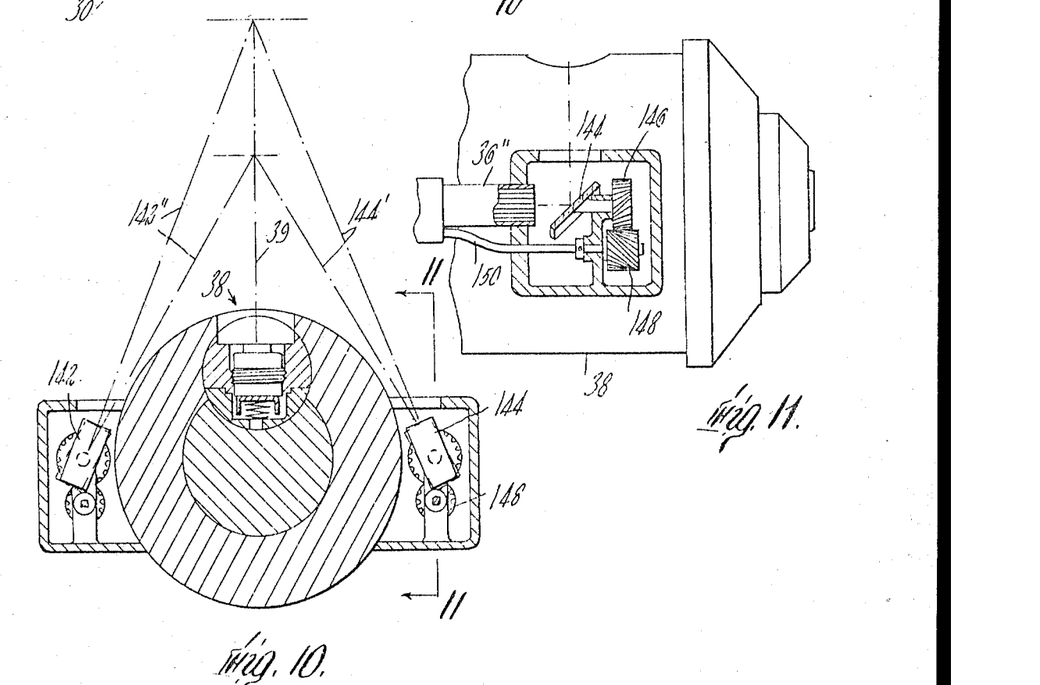
FIG. 10 is a transverse cross-sectional view taken on line 10—10 of FIG. 9.
FIG. 11 is a lengthwise side view, partially cross-sectional, of the light control means taken on line 11—11 of FIG. 10.
Figure 12:
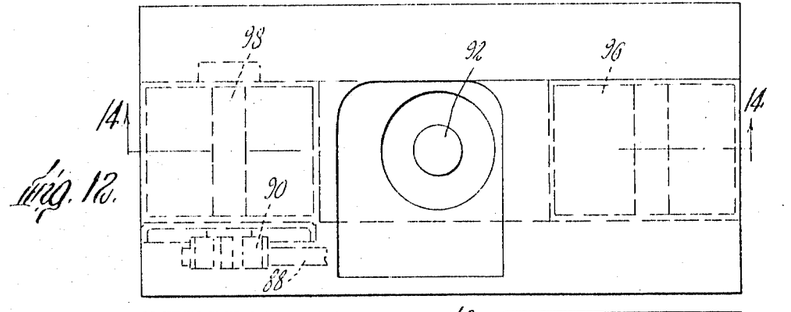
FIG. 12 is a plan view of the camera portion of the device 1.
Figure 13:
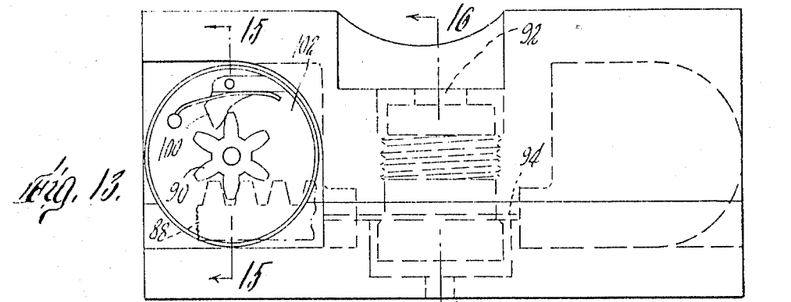
FIG. 13 is a side view of the camera shown in FIG. 12.
Figure 14:
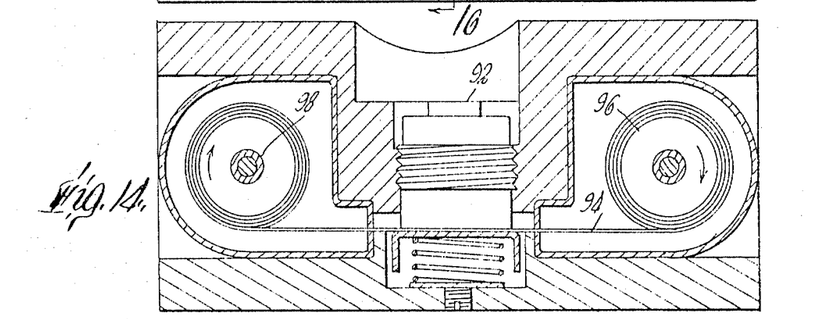
FIG. 14 is a lengthwise cross-sectional view taken on line 14—14 of FIG. 12.
Figure 15:
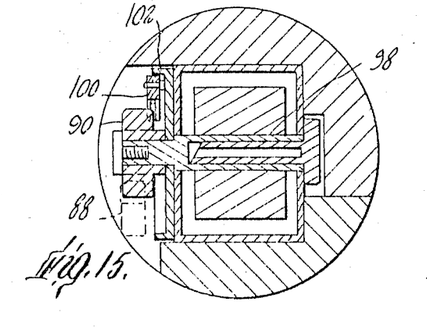
FIGS. 15 and 16 are transverse cross-sectional views taken on lines 15—15 and 16—16 of FIG. 13.
Figure 16:
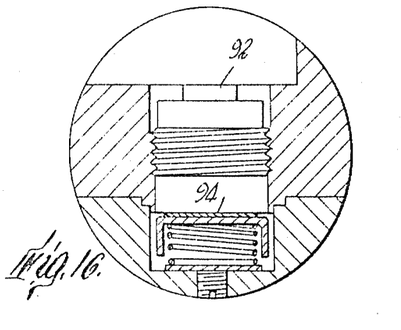

The particular embodiment shown in the drawings is adapted to be used in heat-sensitive areas. For this purpose two tubes containing elongated bundles of light-conductive fibers 36' and 36" (FIGS. 1, 9) extend from the proximal end 32 to the distal end 34 of the device for transmitting "cold" light to illuminate the objects to be inspected. In FIG. 1 the light sources 130 and 132 at the proximal end include parabolic mirrors 127, 129, high powered light bulbs of the size of grains of wheat grouped in star arrangements 134, 136, focusing lenses 138, 140 and heat filters 139, 141 direct cold light into the proximal end of the light-conductive bundles 36a, 36b. At the distal end (FIGS. 1 and 9) mirrors 142 and 144 receive the light from bundles 36a and 36b respectively and direct the cold light toward the objects to be photographed. Referring to FIG. 11, each mirror is mounted in axial alignment with its bundle of fibers, and each mirror is rotatably mounted to shift the direction of the reflected light beam from the bundle in the plane containing the line of sight of the camera to focus the light on objects at various distances from the camera, the mirrors so related that the light beams always intersect on the line of sight 39 of the camera 38. Each mirror is provided with a gear 146 (FIG. 11) which is driven by a mating gear 148 which itself is driven by a flexible torque-transmitting cable 150, 152 that extends through its respective snake-like tube in the manner discussed above. The mirrors and gear drives are mounted on the camera 38 to turn therewith, sufficient slack being provided in the cold light tubes to permit the camera to turn a full circle.

Referring to FIGS. 1, 10 and 11, the cables 150 and 152 are dependently driven to insure the proper intersection of the light beams, the mirrors preferably being disposed equally on opposite sides of the camera. A scale 154 is provided at the turning knob for one of the cables at the proximal end to measure the amount of rotation of one of the mirrors, thus to indicate the distance of the intersection of the two beams of light from the mirrors and camera. Thus, when the light beams intersect on the object being inspected, forming a single spot of light thereon, which can be seen through the viewer bundle 36 of fibers, the scale gives an indication of the distance the object is from the inspecting device.

Referring to FIGS. 1 and 4, articulation or knuckle members 155 are provided in the body of the snake-like member to enable the working end of the camera to "lift its head." Each knuckle member 155 comprises a proximal portion 156 which can be considered to be fixed relative to the snake-like member and a distal portion 158 adapted to pivot relative thereto on an axis 159 that lies through the center of the snake-like member. A threaded male member 160 is engaged with the female threads of a reaction member ball 162 that is rotatably confined in a spherical bearing 164 in the proximal portion 156 of the knuckle. The distal end of the male member 160 is fixed axially to a second ball 166 that is rotatably confined in a second spherical bearing 168 in the pivotal, distal portion of the knuckle. The line of action of the male member is spaced from the axis 159 of the knuckle to exert a moment thereabout hence rotation of the male member 160 causes the two portions of the knuckle to move together and apart. A flexible, torque-transmitting cable 169 drives each male member 160, the cable extending through a passage in the snake-like member, as described above, to an actuating device 170 at the proximal end (FIG. 1). As can be seen in FIG. 4 when one of the knuckles in the snake-like member is pivoted to its full extent the distal part of the snake-like member extends at a substantial angle to the axis 172 of the proximal part of the snake-like member, and by use of a multiplicity of these knuckles the distal part can assume a right angle with respect to said axis (FIG. 1) which enables the head of the snake-like member to work its way through a tortuous path and, to look in various directions.

Important to the precise low friction operation that is needed to make the device of the invention practical is the particular type of connection employed between the male and female threaded components of the device. Prior art thread-forming devices do not produce accurate fits between male and female members, so that the axial force that can be transmitted by them is severely limited. The problem of transmitting adequate force to move knuckles and other components of the device, is solved in a low-cost way by use in the combination of a new threaded connection. Referring to FIG. 18, there is shown a male member 160 having threads formed thereon in a usual way and a ball 162 which has a passage 172 formed therein of a diameter D larger than the outer diameter O.D. of the male member. As a first step in the formation of the mating female threads, a coating 174 of any of the suitable common removable release agents is applied to the threads of the male member, one suitable release agent for epoxy being release agent No. 4368 manufactured by Hysol Corporation, Olean, New York. Then a metal wire 176, preferably round stainless steel wire, of a size insertable in the grooves of the male threads is wound tightly into the threads of the male member (FIG. 19) thereby assuming a conforming helical form. Then a rigid-when-set adhesive material 178, such as epoxy resin, is applied in fluid form between the male member 160, wire helix 176 combination and the walls of passage 172 in the ball 162 and the material 178 allowed to set, firmly bonding the wire helix to the ball in exact conformity with the threads of the male member 160. As seen in FIG. 21, the thickness of the release agent coating 174 controls the clearance between the helical wire 176 and the male threads. After the plastic is hardened the male member 160 is unthreaded from the ball 162, the wire staying behind in the ball. Then the release agent can be removed sufficiently to provide free movement, e.g. by light buffing, or it can be dissolved by an appropriate solvent. If removed by light buffing, some of the release agent can be retained to fill the metal pores, smooth any imperfections and provide lubrication. The male member is then rethreaded into the thus formed female threads in the ball, the clearance or class of fit depending upon the easily regulated number and thickness of release agent microinch-thick coatings originally applied to the male member.

By this simple procedure an extremely accurate conformity between male and female threads is achieved, even when the male threads are initially formed by a very irregular die, and the wearing surface of the female threads is metal. Round wire is particularly preferred for obtaining exact conformity, the wearing surface lying at the tangents T between the round wire and the ribs 180 of the male threads. Such female threads of extreme accuracy of mating can be formed in metal pieces by drilling and reaming holes to form the initial passage and proceeding as above with the wire of a diameter that causes it to protrude, as shown, beyond the O.D. of the male member threads when engaged upon the ribs of adjacent threads. It is also possible for the body of the female member to be formed of the rigid bonding material such as epoxy simultaneously with the forming of the female threads. Every male-female threaded coupling for the torque-transmitting cables is formed in this manner. While this combination has been the secret to the practical success of the snake-like members of the invention, it also has many other general uses.

In operation of the preferred embodiment, while the light bulbs are energized at viewing intensity, the snake-like member is worked into a remote area, the operator watching its progress through eye piece 40 while turning the viewing device by cable 116, the snake member being guided by the actuation of knuckles 155 by cables 159. When in the proper location the knuckles are adjusted by their cables to "raise the head" of the snake-like member to the proper location then the camera and viewer mirror and objective lens are rotated to the proper position by cable 116, and the focus is adjusted by cable 58 upon the object desired. The angle of illumination mirrors 142, 144 are dependently adjusted by cables 150, 152 to create a single spot of light on the object, the angular adjustment being read from scale 154 (FIG. 1) for determining the distance of the object from the inspection device. Then the timer and controller 106 is energized which commences the sequence of turning off the lights, energizing motor 104 to cause cable 84 to pull a new frame of film into position by rack member 88, then to energize the lights at flash intensity for a controlled interval to control the time of exposure of the film, then to re-energize the motor 104 to take-up the exposed frame, and to reverse the motor to return the rack member to its original position, then to re-energize the lights at viewing intensity causing the exposure and loss of some of the film.

Figure 23:
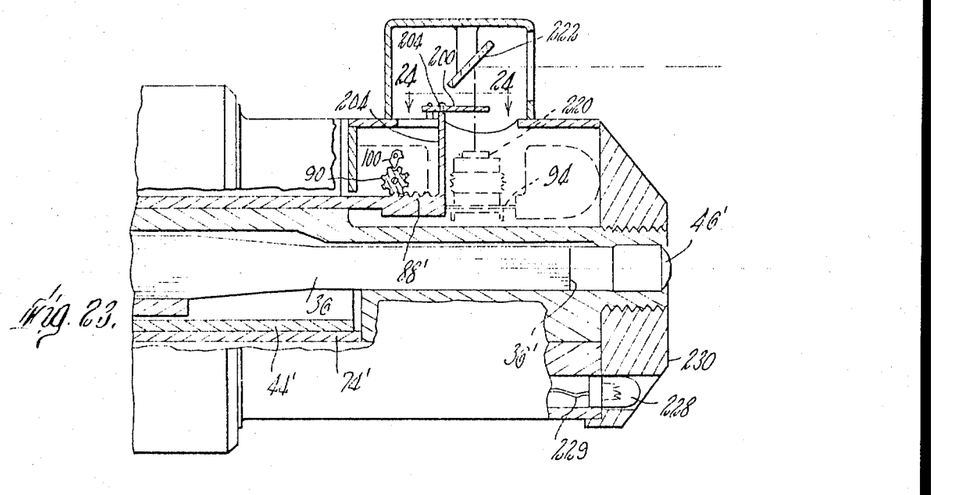
FIG. 23 is a side sectional view of another preferred embodiment of the camera and viewer head.
Figure 24:
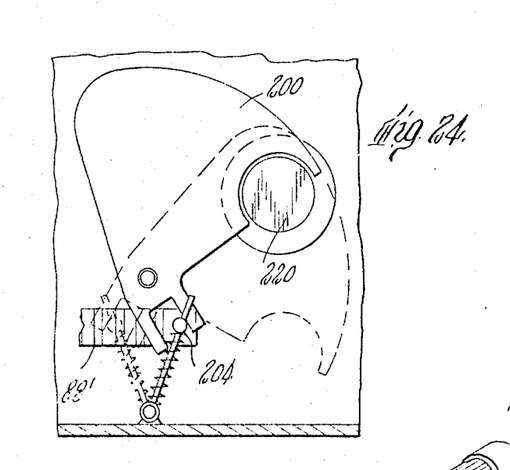
FIG. 24 is a plan view of the shutter of FIG. 23 taken on line 24—24 thereof.
Figure 25:
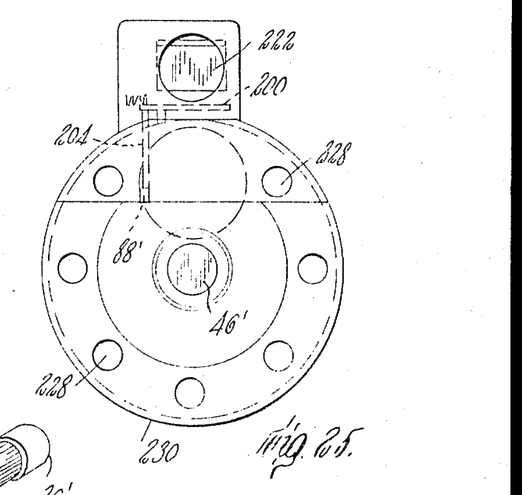
FIG. 25 is an end view of the embodiment of FIG. 23.

Referring to the preferred embodiment of FIGS. 23–25, to avoid wasting film during viewing and to shorten the interruption of viewing caused when a picture is taken, a shutter member 200 is employed over the fixed camera lens 220, adapted for spring-overcenter snap action from closed to open positions, and the change-film rack member 88' is provided with an actuating pin 204 that extends into driving engagement with the shutter member 200. The operating cycle of this camera as regulated by the controller 106 is turning off viewing lights, movement of rack member 88' to the left, positioning a fresh frame under the camera lens, terminal movement of the rack member 88' snapping shutter 200 open, energization of lights at flash intensity for a controlled interval to control the time of exposure, and returning the rack member to the right thus snapping the shutter back to closed position, the rack 88' ratcheting on the dog 100 so that the position of the film 94 is not disturbed. Thus the shutter 200 only protects and saves the film and shortens the drive required to take a picture and return to viewing position. The timing of movement of the shutter member is not critical and a threaded member on the end of a torque-transmitting cable is able to control its movement.

The inspection head of this embodiment is mounted for inspection axially of the snake-like member rather than transversely, and the camera is not rotatable relative to the snake-like member, the knuckle members providing for its manipulation. This inspection head comprises a carrier member 44' mounted for axial movement relative to the end face 36' of the bundle 36 of fibers, which carries only an objective lens 46', this being located for axial viewing. The camera is off-set slightly from the bundle axis, and includes an objective lens 220 and a mirror 222 set at an angle thereto. Rack member 88' is mounted on carrier member 74' for axial movement relative to the bundle 36 of fibers, adapted to take-up film in the manner already described. By enlarging the camera and shortening its length, wide angle lenses can be employed for viewer and camera.

Another feature of this embodiment is the spaced-apart series of tiny electric bulbs 228, of the size of wheat seeds, disposed in the end plate 230 of the head of the device, controlled by electric wires 229 extending back along the snake-like member.

It will be apparent that the embodiment of FIGS. 23–25 can be made interchangeable with the head shown in FIG. 1, depending upon the size of the instrument, so that great versatility in mode of operation can be obtained. Also it is possible to obtain stereoscopic viewing by use of a single bundle of fibres, upon which two spaced-apart end faces are provided for different groups of adjacent fibers, and using two spaced-apart objective systems therefor, with the cable driven threaded adjustments herein described.

Figure 26:
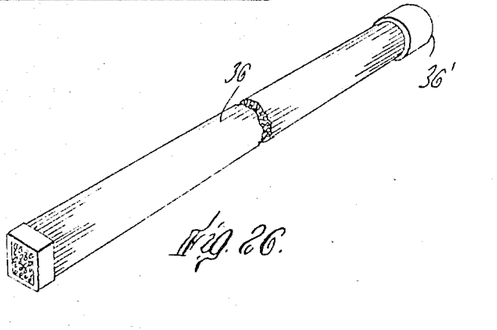
FIG. 26 is a perspective view of a bundle of fibers according to the invention.

In FIG. 26 is shown the bundle of fibers according to the invention wherein the distal end is round thus permitting the snake-like member head to be smaller than with the bundles of the prior art for the same light-transmitting capability.

Numerous modifications of the specific details of the invention will be obvious to those having ordinary skill in the art.

What is claimed is:

1. An inspection device comprising an elongated snake-like member which has a distal end for inspecting a remote area and a proximal end at which the device is controlled, the snake-like member incorporating at least one flexible bundle of elongated light-conducting fibers extending between said two ends, an adjustment mechanism supported by said snake-like member at a point spaced from said proximal end, said adjustment mechanism having at least one component adapted to move relative to the body of said snake-like member to control said inspection, an elongated, flexible, torque-transmitting cable extending from said proximal end to said mechanism along said flexible bundle of fibers and supported by said snake-like member, a reaction block means located near said mechanism and fixed longitudinally to the body of said snake-like member, said reaction block means threadably engaged with cooperating means on said flexible cable to enable the latter to apply an adjustment force to said movable component, the portion of said torque-transmitting cable engaged with said block means being restrained by said block means from longitudinal movement in the absence of rotation of said cable, connector means drivingly connecting the respective end of said flexible cable and said movable component of said adjustment mechanism, and means at the proximal end of said device adapted to rotate said flexible cable.

2. The inspection device of claim 1 wherein said reaction block means that cooperates with said elongated torque-transmitting flexible cable comprises a round threaded reaction member fixed to said snake-like member, the flexible cable supporting a threaded member engaged with the threads of said reaction member in a male-female relation, the female member comprising a body member defining a passage, a metal wire formed into a multiplicity of helical turns disposed in the grooves of the threads of said male member and exposed to engage adjacent ribs of said threads, said wire disposed within said passage of said body member in axial alignment therewith, and a rigid metal-bonding adhesive disposed between said wire and said body member bonding them together.

3. The inspection device of claim 2 wherein said body member comprises a metal member, the passage being a reamed hole therein of a diameter greater than the outer diameter of the threads of said male member and said wire helix has its outer portion extending beyond the outer diameter of said threads of said male member.

4. The inspection device of claim 1 wherein said snake-like member includes an elongated, flexible tubular outer protective sheath, said flexible bundle of elongated light-conducting fibers and said elongated, torque-transmitting cable disposed within said sheath, a generally circular positioning member disposed about said bundle of flexible fibers and engaged with the inner surface of said sheath, a lengthwise extending groove formed in the outer surface of said positioning member, and said flexible torque-transmitting cable disposed in said groove, confined between said sheath and said positioning member.

5. The inspection device of claim 1 wherein the distal end of said bundle of fibers is axially aligned with a tubular covering in which it is disposed, said torque-transmitting cable extending within said covering spaced from the axis of said covering.

6. The inspection device of claim 1 in which said torque-transmitting cable is drivingly connected at one of its ends to a rotatable means whose axis coincides with that of said flexible cable, the rotatable means being restrained from axial movement with said snake-like member, the portion of said torque-transmitting cable connected to said rotatable means defining axially extending spline surfaces slidably engaged with corresponding surfaces of said rotatable means, whereby said torque-transmitting cable is able to slide axially relative to said rotatable means when said snake-like member bends so that said torque-transmitting cable does not impede bending of said snake-like member.

7. The inspection device of claim 1 wherein said bundle of fibers is adapted to transmit a light image to the operator at said proximal end, said adjustment mechanism controls an optical system that is aligned with the distal end face of said bundle of fibers to direct a light image into said end face, said optical system mounted for rotation about the axis of said end face, said flexible, torque-transmitting cable adapted to turn said optical system on said axis to carry out an inspection, the reaction means comprising a bearing rotatably mounting said cable, and said means drivingly connecting said cable with said optical system comprising a pinion fixed to said flexible cable and a bull gear associated with said optical system.

8. The inspection device of claim 1 wherein said bundle of fibers is adapted to transmit a light image to the operator at said proximal end, and said adjustment mechanism controls an optical system that is aligned with the distal end face of said bundle of fibers to direct a light image into said end face, said optical system mounted to move relative to the end of said bundle of fibers and relative to said snake-like member to change the image being directed into said bundle of fibers, the corresponding end of said flexible cable drivingly connected to said optical system, and said reaction means comprising a threaded reaction member fixed to said snake-like member, the flexible cable having a cooperating threaded portion engaged with the threads of said reaction member whereby rotation of said flexible member causes its end connected to said optical system to move axially, and displace said optical system relative to the distal end of said bundle of fibers.

9. The inspection device of claim 1 wherein said bundle of fibers is adapted to transmit a light image to the operator at said proximal end, and said adjustment mechanism controls an optical system that is aligned with the distal end face of said bundle of fibers to direct a light image into said end face from objects lying beyond the axis of the end face of said bundle of fibers, said optical system mounted on a carrier member, said carrier member mounted to rotate about said axis and to slide axially relative thereto, means to rotate said carrier member, said carrier member having a circular flange concentric with the axis of elongation of said bundle of fibers, a push-pull member engaged with said flange, said push-pull member restrained from rotation with said flange but adapted to permit rotation thereof, said push-pull member adapted to move parallel to the axis of said bundle of fibers to move said carrier member, thereby to adjust the focus of said optical system relative to said bundle of fibers, a flexible torque-transmitting cable extending along said bundle of fibers from said proximal end of said device to driving engagement with said push-pull member and supported by said snake-like member, a reaction means for said cable in the form of a threaded reaction member fixed to the body of said snake-like member, said flexible cable having a co-operating threaded portion engaged with the threads of said reaction member whereby rotation of said flexible cable causes its end to drive said push-pull member to move said mirror axially.

10. An inspection device comprising an elongated snake-like member which has a distal end for inspecting a remote area and a proximal end at which the device is controlled, the snake-like member incorporating at least one flexible bundle of elongated light-conducting fibers extending between said two ends, said device carrying a camera at its distal end, said bundle of flexible light-conducting fibers being adapted to transmit a light image to the operator at said proximal end, and the distal end face of said bundle of fibers located adjacent said camera for providing a viewing device therefor, a remotely controllable adjustment mechanism adapted to take-up the film in said camera while allowing said viewing device to be located close to said camera, said mechanism including a film take-up reel and a one direction drive pinion means engaged with a rack that is movable back and forth in the direction of length of the snake-like member, said rack secured to a push-pull member extending along said bundle of fibers and axially movable relative thereto in response to remote actuation means to move said rack to take up said film and permit a series of photographs to be taken under remote supervision.

11. The inspection device of claim 10 wherein said camera is provided with a shutter and said rack member mounts a shutter actuating pin adapted to open and close said shutter with movements of said rack member.

12. The inspection device of claim 10 wherein said camera is adapted to turn about the axis of said snake-like member, said rack member joined to a circular flange member extending about said bundle of fibers, said flange member adapted to turn with said camera and free to move axially relative to said camera along said bundle of fibers, said push-pull member adapted to adjust said flange axially, said push-pull member restrained from rotation with said flange but adapted to permit rotation thereof.

13. The inspection device of claim 12 wherein a carrier member mounts an optical system to rotate on the axis of the end of said bundle of fibers dependently with rotation of said camera, said carrier member adapted to move axially relative to said bundle of fibers and relative to the circular flange that adjusts the film in said camera to adjust focus, a second circular flange connected to said carrier member, a second push-pull member engaged with said flange, said second push-pull member adapted to move said carrier member parellel to the axis of said bundle of fibers, and means for moving said second push-pull member comprising a flexible, torque-transmitting cable extending from said proximal end of said inspection device to said second push-pull member along said flexible bundle of fibers and supported by said snake-like member, a reaction means located near said second push-pull member and fixed to the body of said snake-like member, said reaction means engaged with said flexible cable to enable the latter to apply an actuating force, means drivingly connecting the respective end of said flexible cable and said second push-pull member and means at the proximal end of said inspection device adapted to rotate said flexible cable to drive said second push-pull member.

14. The inspection device of claim 13 wherein said two flanges surround said bundles of fibers at points spaced toward the proximal end of said device from the distal end of said bundle of fibers, and from each flange a cylinder extends toward said distal end of said bundle of fibers to connect said flanges to their respective rack and optical system, said cylinders being concentric and in sliding engagement enabling telescopic movement thereof.

15. The inspection device of claim 1 wherein said adjustment mechanism comprises a knuckle member in the body of said snake-like member, and has a movable part that is adapted to turn about an axis that is substantially transverse to the lengthwise axis of said snake-like member, the movable part of said knuckle member supporting the distal portion of said inspection device and adapted to change the orientation of said distal portion relative to the remaining portion of said snake-like member to carry out an inspection, the corresponding end of said flexible cable connected to said movable part at a point spaced from said transverse axis to apply a turning moment to said movable part, said reaction means comprising a threaded reaction member fixed to the remaining portion of said snake-like member, the flexible cable having a cooperating threaded portion engaged with the threads of said reaction member whereby rotation of said flexible member causes its end connected to the movable part of said knuckle member to turn about its transverse axis.

16. The inspection device of claim 1 wherein the bundle of light-conductive fibers extending along said snake-like member is adapted to transmit light from said proximal end to said distal end of said device to illuminate objects to be inspected, inspection means at the distal end adapted to inspect said objects, a mirror axially aligned with the distal end face of said bundle of fibers to reflect light from said bundle of fibers toward said objects, said mirror being off-set from the line of sight of said inspecting means, said mirror being movable about an axis to vary the point of intersection between light from said mirror and said line of sight, said mirror being said movable component that is driven by said flexible cable.

17. The inspection device of claim 16 wherein two spaced-apart mirrors are provided, one axially aligned with the distal end of each of two sets of flexible, light-conducting fibers, each mirror being rotatable to vary the point of intersection between light from said mirror and the line of sight of said camera, said mirrors being spaced oppositely from said line of sight, means provided to turn said mirrors in opposite directions to make the point of intersection of the light from said two mirrors to fall on said line of sight of said camera, and means to measure the rotation of one of said mirrors relative to a reference to indicate the distance between the inspection means and an object being inspected when the light beams from said mirrors are adjusted to fall on the same spot on said object.

18. In an inspection device in the form of an elongated snake-like member a camera having a line of sight extending at a substantial angle to the axis of said member, a bundle of elongated light-conducting fibers extending generally parallel to said axis and adapted to transmit a light image from adjacent the camera to an operator located away therefrom, an optic system aligned with the end face of said bundle of fibers adjacent said camera adapted to direct a light image from the general direction of said camera line of sight into said end face, said optic system mounted to rotate on the axis of the end face of said bundle of fibers, adapted to direct an image into the bundle of fibers at all rotational positions, said camera adapted to turn with said optic system to maintain alignment therewith and means extending along the length of said snake-like member adapted to transmit a force from a remote control position to move said optic system axially of said bundle of fibers to adjust focus.

19. An inspection device for inspecting remote, heat-sensitive areas, the device including an elongated snake-like member that has a distal end that supports means for optically inspecting said areas into which said distal end is inserted, a proximal end at which the device is operated, the snake-like member incorporating at least one flexible bundle of elongated light-conducting fibers that are adapted to transmit a light image from an optical system at said distal end to the operator, a second flexible bundle of elongated light-conducting fibers extending to said distal end from a light source remote therefrom, and means cooperating with the distal end of said second bundle of fibers to direct a light beam to substantially intersect the line of sight of said optical system at said distal end of said first bundle of fibers.

References Cited by the Examiner

UNITED STATES PATENTS

| | | | |
|---|---|---|---|
| 1,256,886 | 2/1918 | Eberhard | 95—64 |
| 2,641,977 | 6/1953 | Uji | 95—11 |
| 2,740,136 | 4/1956 | Chiaberta | 10—10 |
| 2,975,785 | 3/1961 | Sheldon | 128—6 |
| 3,062,070 | 11/1962 | Beatty | 74—459 |
| 3,090,378 | 5/1963 | Sheldon | 128—4 |
| 3,091,235 | 5/1963 | Richards | 128—6 |

JOHN M. HORAN, *Primary Examiner.*